May 1, 1956  E. McI. ERVIN  2,743,824
MACHINE FOR USE IN HARVESTING CROPS
Original Filed Jan. 26, 1950  5 Sheets-Sheet 1
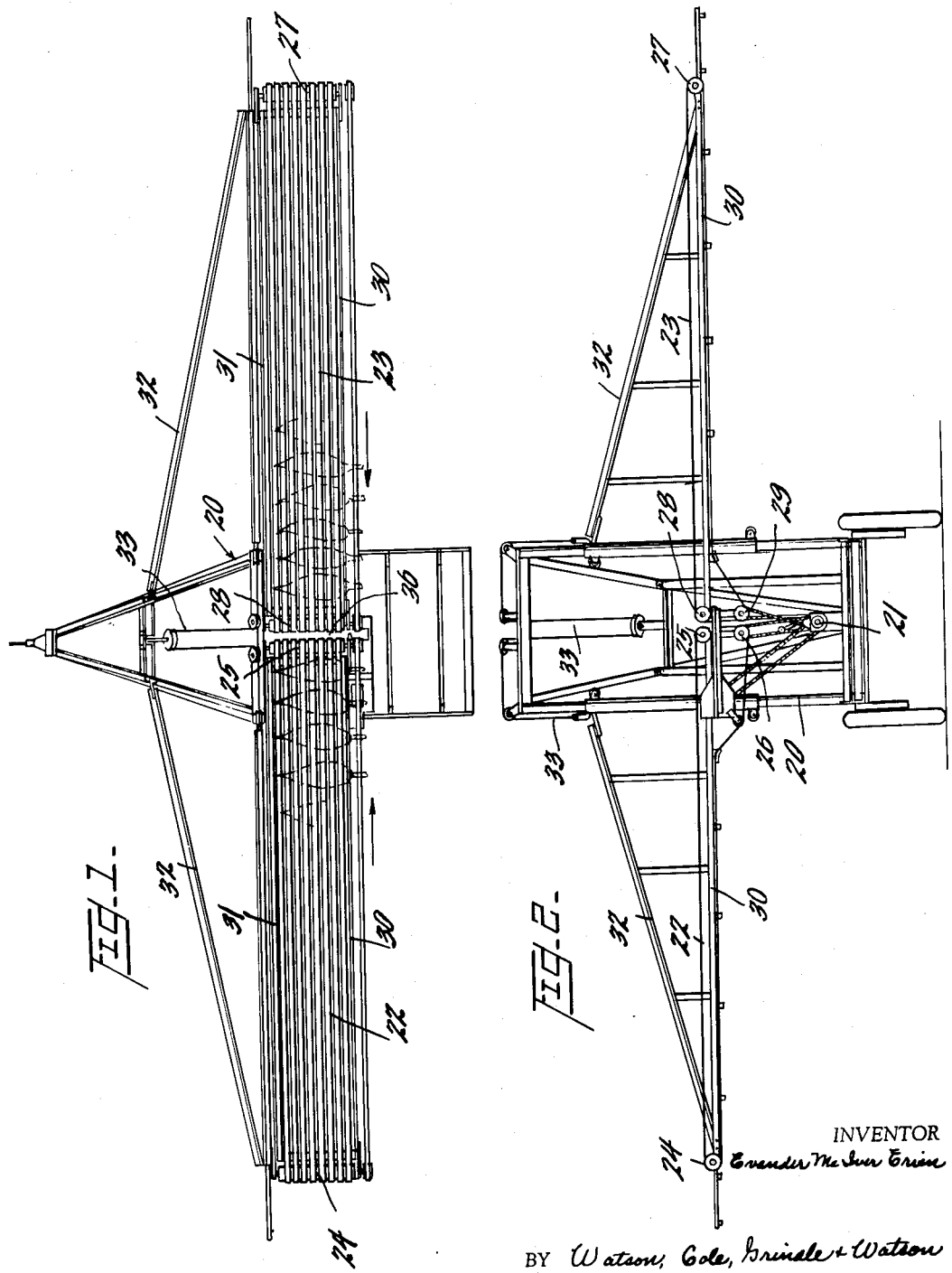
INVENTOR
Evander McIver Ervin
BY Watson, Cole, Grindle & Watson
ATTORNEY

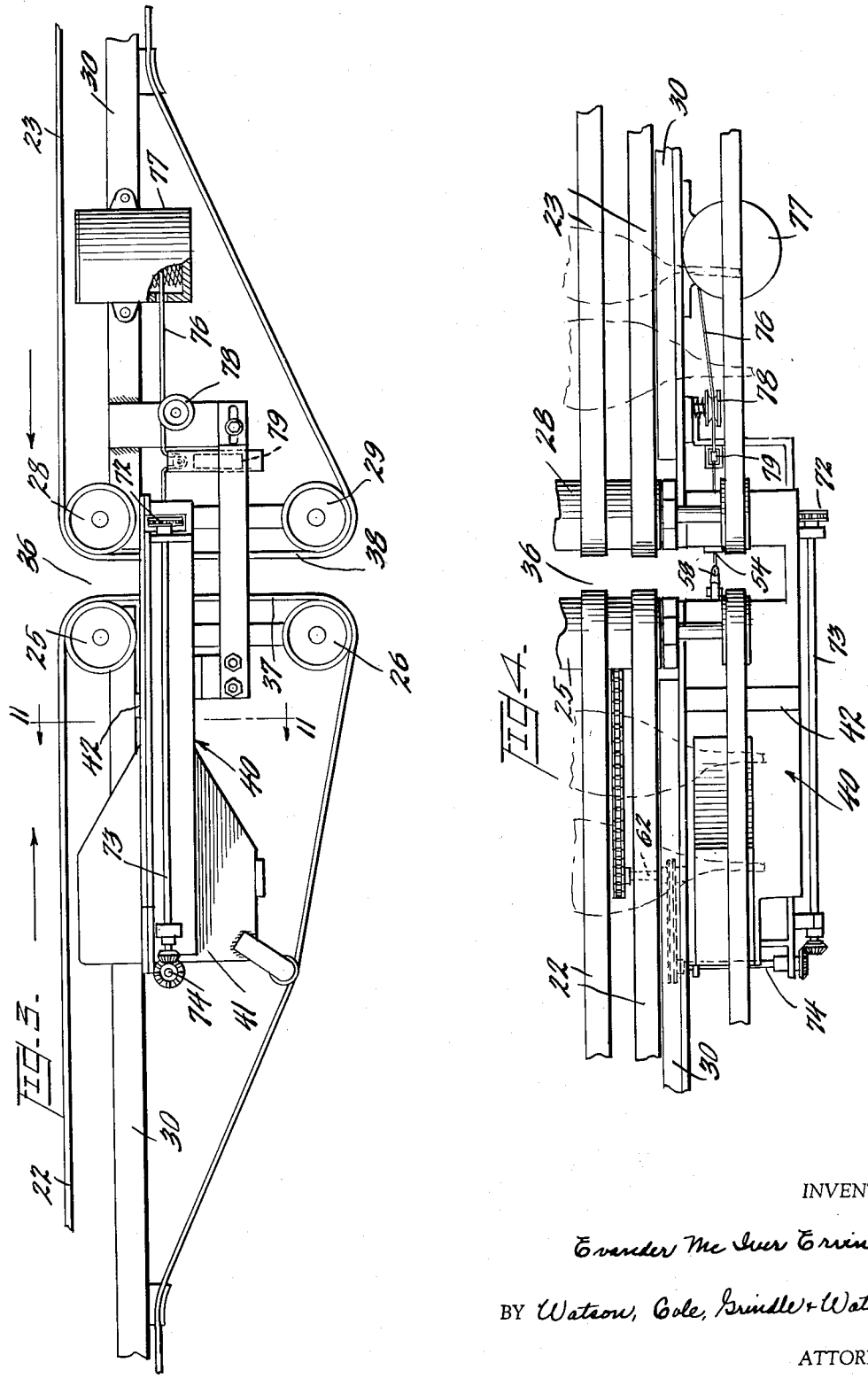

May 1, 1956  E. McI. ERVIN  2,743,824
MACHINE FOR USE IN HARVESTING CROPS
Original Filed Jan. 26, 1950  5 Sheets-Sheet 3
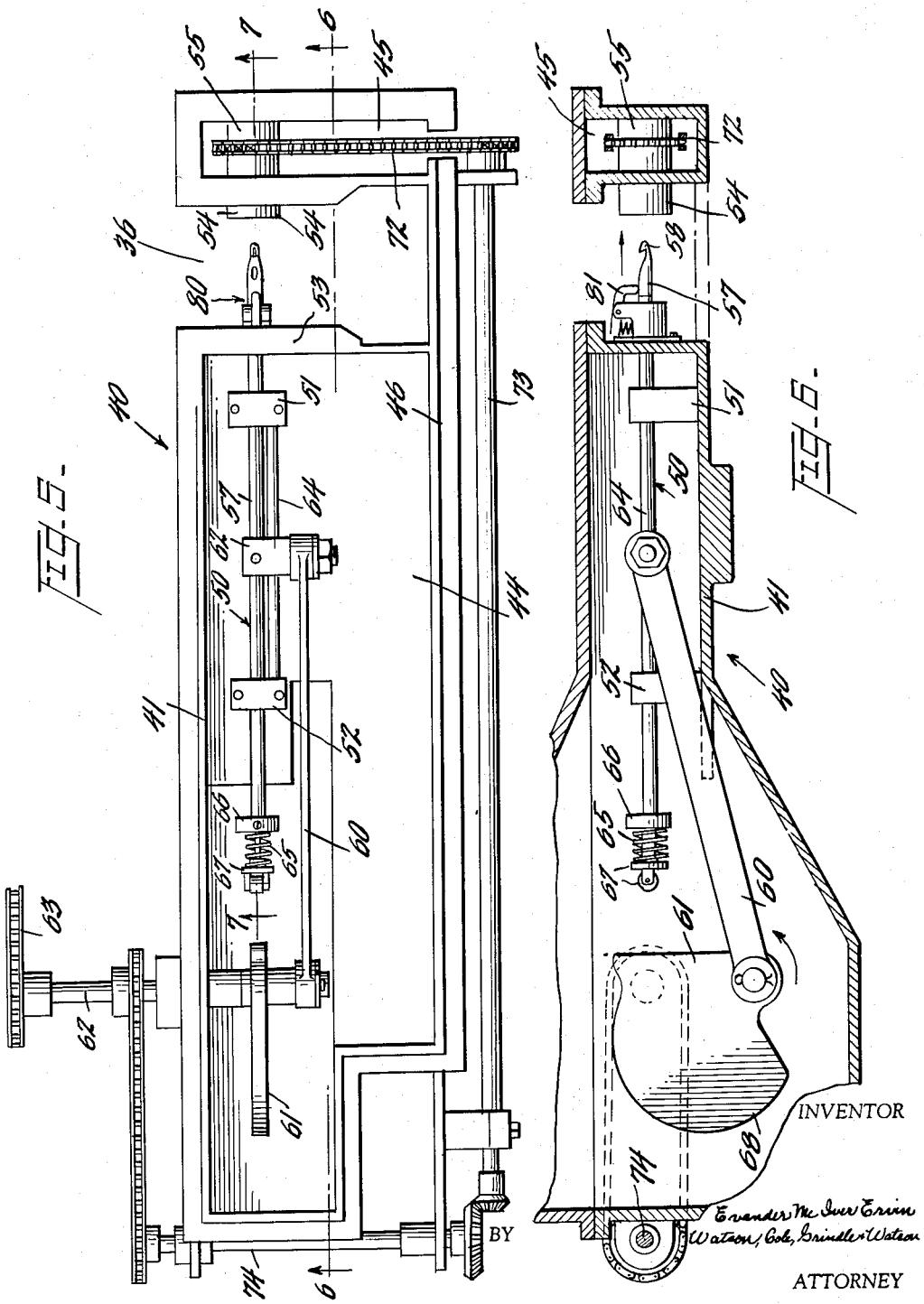

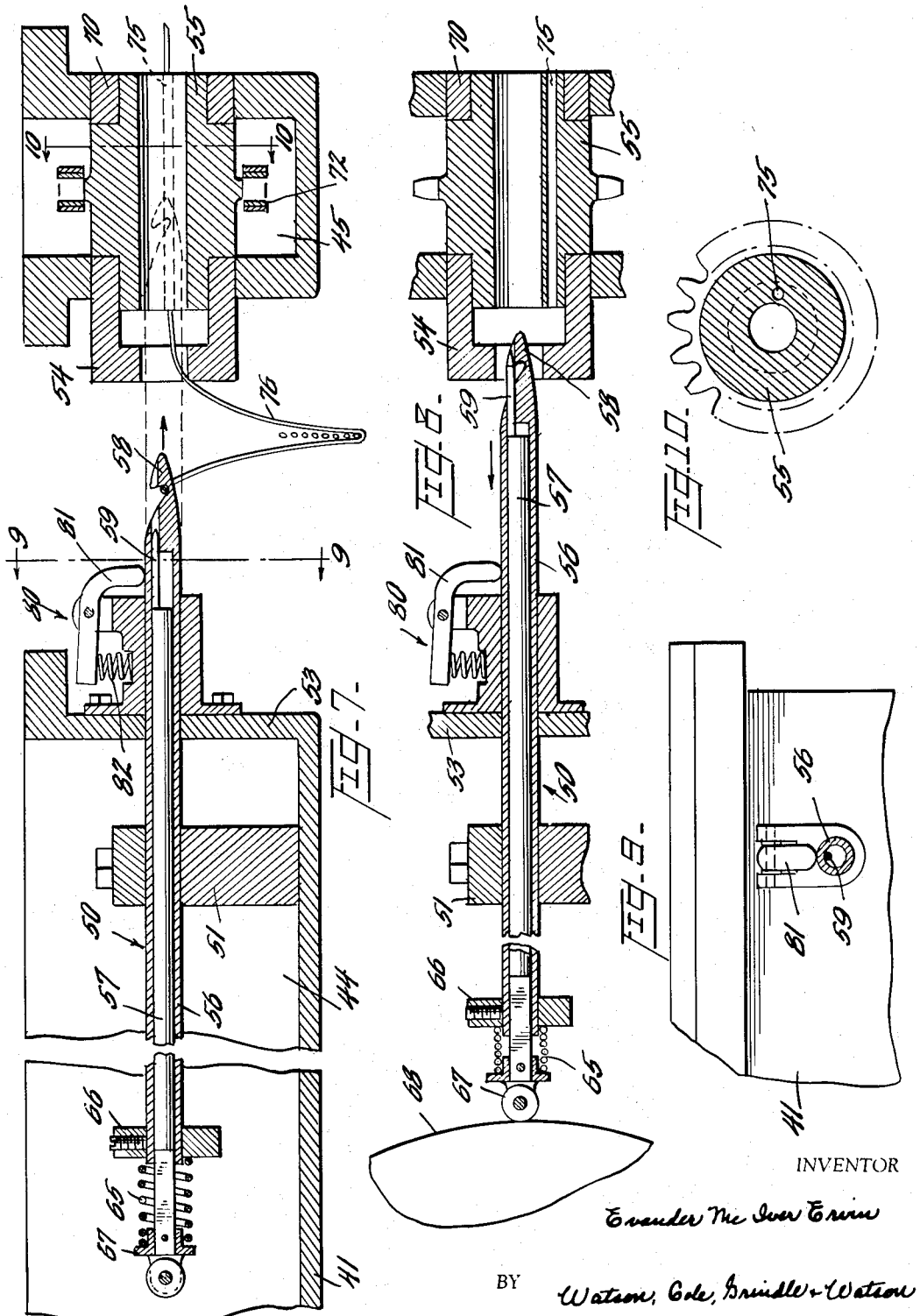

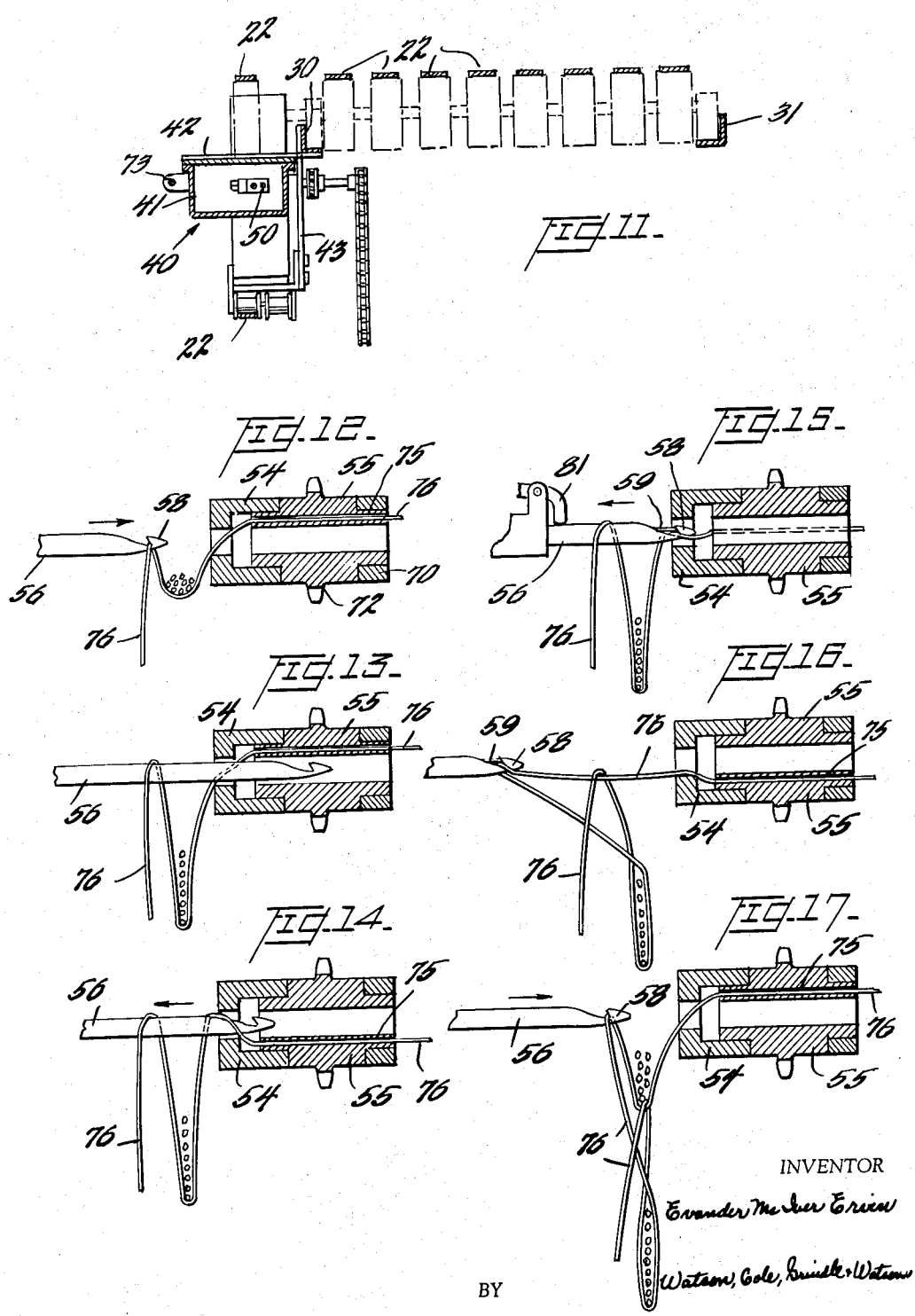

United States Patent Office 2,743,824
Patented May 1, 1956

2,743,824

MACHINE FOR USE IN HARVESTING CROPS

Evander McIver Ervin, Florence, S. C.

Substituted for abandoned application Serial No. 140,655, January 26, 1950. This application June 14, 1954, Serial No. 436,352

7 Claims. (Cl. 214—5.5)

This invention relates to machines for use in harvesting crops which comprise means for conveying harvested crops to a crop receiving station at which the harvested crops are acted upon by a stringing mechanism which continuously strings together the harvested crop supplied to the machine, and is a substitute for applicant's abandoned application Serial No. 140,655. In particular, the invention relates to improvements in semi-automatic harvesting machines of the type described in my copending application Serial No. 584,117 filed March 22, 1945, now abandoned by means of which improvements the crops gathered with such machines may be conveniently and expeditiously strung together to facilitate handling the crops during subsequent processing where such is required.

The invention is particularly useful in connection with harvesting tobacco crops and stringing together the harvested tobacco leaves in a manner which permits the leaves to be subsequently stored in a curing house without requiring further preparations for supporting the leaves therein.

In my co-pending application, identified above, I have disclosed a harvesting machine comprising a conveyor mounted on a mobile frame which may be drawn across a tobacco field, or the like, longitudinally of the rows when in its operative position in which it extends over a plurality of rows. Leaves of tobacco severed manually from the plants by workers proceeding along the rows spanned by the conveyor are deposited on the conveyor and carried to a crop receiving station at which the leaves were heretofore secured to sticks. The sticks served to support the leaves during the subsequent curing process.

The general purpose of this invention is to further improve the savings of labor and time necessary to harvest and gather crops, such as tobacco, by providing a crop binding means in conjunction with harvesters of the type described which speed and reduce the handling of the crop required to prepare the crop for subsequent processing. More particularly, the invention is concerned with providing a crop stringing mechanism for machines of the type described in which the conveyors employed to gather the crop at a crop receiving station are arranged to efficiently assist the feeding of crop to the stringing mechanism, and thereby effect considerable simplification of the stringing mechanism.

Another object of the invention is to provide an improved stringing mechanism of the type which may be employed efficiently in conjunction with harvesters of the type described.

Other objects and advantages of the invention will be apparent from the following detailed description made with reference to the accompanying drawings in which, by way of example, one embodiment of the invention is disclosed.

It will be understood that the machine illustrated in the drawings is one which was designed and constructed primarily for use in harvesting and stringing tobacco, and that where other crops are to be harvested, the various modifications and changes which will occur to one skilled in the art as necessary to adapt the machine to the particular characteristics of such other crops are intended to be included within the scope of the invention defined by the appended claims.

In the drawings:

Figure 1 is a plan view of the harvesting machine showing the conveyors extending laterally from the frame member in their operative position;

Figure 2 is a front elevation of the machine shown in Figure 1;

Figure 3 is a fragmentary view of the conveyor assembly in front elevation showing the crop receiving space defined between the proximate ends of the two conveyors and the position of the stringing mechanism with respect thereto;

Figure 4 is a plan view of the mechanism shown in Figure 3;

Figure 5 is a top plan view of the stringing mechanism;

Figure 6 is a section on line 6—6 of Figure 5;

Figure 7 is a vertical section on the line 7—7 of Figure 5; an advanced position of the needle element being indicated in dotted lines;

Figure 8 is a longitudinal vertical section through the needle element and threading ring of the stringing mechanism showing the manner in which the needle bolt is maintained in its advanced position as the needle element is retracted from the crop receiving space;

Figure 9 is a view, partially in section, on line 9—9 of Figure 7;

Figure 10 is a vertical section on line 10—10 of Figure 7;

Figure 11 is a section on line 11—11 of Figure 3; and

Figures 12–17, inclusive, illustrate the needle element, the threading ring, and the loop shedding elements of the stringing mechanism in their successive positions with respect to one another as the needle element is advanced and thereafter retracted across the crop receiving space to effect the stringing together of the crop forced downwardly through the crop receiving space.

As it is shown in Figure 1 of the drawings, the machine disclosed is mounted upon a wheeled frame generally indicated by the numeral 20. The apparatus is preferably drawn by a tractor, truck or the like having a power take-off such as 21 from which power for the operation of the machine may be taken.

The conveyors 22 and 23 extend laterally from the frame in opposite directions and may consist of a plurality of spaced endless belts such as indicated in Figure 1. The belts of conveyor 22 are passed around the spaced parallel rollers 24, 25, 26; and the belts of conveyor 23 around the similarly disposed rollers 27, 28, 29. Each of the named rollers is supported for rotation on a shaft mounted on the conveyor assembly, and the conveyor may be driven by chain and sprocket connections between the power take-off 21 and one of the rollers, or other suitable means. In the embodiment illustrated, the rollers 24, 25, 27, 28 are supported on shafts journaled in brackets mounted on the longitudinal conveyor frame members 30, 31. The conveyor assembly may be structurally strengthened by means of braces such as 32 and may include means such as indicated generally at 33 for raising or lowering the conveyor assembly to position the laterally extending conveyors at the desired distance above the ground. Further details of the construction of a harvesting machine suitable for use in connection with the instant invention are disclosed in my co-pending application, identified above.

The instant invention relates chiefly to the portions of the machine shown in greater detail in Figures 3-17, inclusive.

Referring to Figures 3 and 4, it will be observed that the conveyors 22 and 23 are operated in such manner that the upper reaches thereof move in opposite directions as indicated by the arrows shown in Figure 3, so that articles placed thereon while the harvester is in operation will move toward the midpoint of the apparatus, i. e., toward a point above the frame 20. The proximal ends of the conveyors 22 and 23 are spaced apart to provide a crop receiving space 36 therebetween. The returning rollers 25, 26 of the conveyor 22, as the returning rollers 28, 29 of the conveyor 23, are positioned substantially one above the other, thus disposing the return reaches 37, 38 of the conveyors approximately in vertical parallelism. It will be seen, therefore, that the crops deposited on the conveyors 22, 23 will be carried to the crop receiving space 36 between the proximate ends of the conveyors, and the combined bulk of the crop will be forced downwardly through the space by the action of the return reaches 37, 38 of the conveyors which form the side walls of the space.

A stringing mechanism, which is indicated generally by the numeral 40 in Figure 3, is supported with respect to the crop receiving space 36 so that its reciprocating needle element may traverse the space and effect the stringing together of the crops forced downwardly therethrough.

The stringing mechanism comprises a housing 41 which may be secured in the described position on the conveyor assembly by means of plates such as 42 and 43 rigidly fixed to the longitudinal frame member 31 in the manner illustrated in Figure 11.

The construction of the stringing mechanism and the manner of operation thereof which effects the described binding of the crops is shown in more detail in Figures 5-17, inclusive. Referring to Figures 5 and 6, it will be seen that the stringing mechanism housing 41 is formed to provide chambers 44 and 45 spaced apart along the front wall 46 of the housing a distance slightly greater than the width of the space 36 between the return reaches 37, 38 of the conveyors.

The needle element 50 of the stringing mechanism is supported for reciprocatory movement in annular bushings held in the blocks 51, 52 fixed to the floor of the chamber 44. The chamber wall 53 is provided with a suitable aperture through which the needle element may be advanced across the crop receiving space 36 to pass through the central aperture of the annular loop shedding ring 54 and enter the threading ring 55; both rings being supported in the side walls of the chamber 45 coaxially with the longitudinal axis of the needle element. As shown most clearly in Figures 7 and 8, the needle element comprises a tubular body portion 56, and a bolt 57 slidably supported within the tubular body portion. The leading end of the needle body is provided with a hook portion 58 which when advanced across the space 36 into the threading ring 55 engages a bight of a binding line which is cast on the hook by the threading ring, as hereafter explained in more detail. The bolt 57 is actuated so that the cylindrical prong 59 thereof emerges from an aperture provided in the tubular body portion of the needle immediately to the rear of the hook portion as the needle element is retracted across the space 36, whereby the bight of the binding line cast on the hook by the threading ring is retained thereon as required for the proper operation of the stringing mechanism.

The needle element 50 is reciprocated by means of the connecting rod 60 which at one end is fixed to the crank plate 61 and at the other to drive block 62 which is clamped to the shank of the needle body intermediate the bearing blocks 51, 52, as shown most clearly in Figures 5 and 6. The crank plate is fixed for rotation with the driven shaft 62 which in turn is driven by the chain and sprocket connection 63 to the power take-off 21, best seen in Figure 2.

In order to insure that the binding line will be cast on the hook of the needle when the needle enters the threading ring, it is necessary to maintain the hook opening in an upwardly facing direction. This is accomplished by providing an aperture in the drive block 62 through which is passed the guide rod 64 to the block 51, 52 in spaced parallelism with the needle element.

The bolt actuating means which acts to move the bolt over the hook opening of the needle as the needle element is being retracted across the space 36 includes a spring 65 which abuts collar 66 and a cam roller assembly 67 fixed to the proximal ends of the needle body and the bolt, respectively; the spring normally acting to hold the bolt in its retracted position as illustrated in Figures 5 and 7.

The edge of the crank plate 61 is configured to provide a cam surface 68 which engages periodically the cam roller 67 and forces the bolt 57 fixed thereto forwardly as the crank plate is rotated through the positions which correspond to those in which the connecting rod 60 is moving to the left as seen in Figure 6 and thus retracting the needle element across the space 36. One such point during the rotation of the crank plate at which the cam surface 68 engages the cam roller 67 to advance the bolt over the hook opening as the needle element is retracted is illustrated in Figure 8.

The construction of the threading ring may be seen most clearly in Figures 7 and 8. It will be observed that the outer diameter of the ring is reduced toward either end thereof; one of the ends of reduced diameter being journaled in the inner circumference of the annular loop shedder 54 and the other in a bushing 70 supported in a wall of the chamber 45. Intermediate the journals, the outer circumference is provided with a ring of sprocket teeth by means of which the ring is rotated through the agency of the chain and sprocket connection 72 to the power transmission shaft 73. In turn, the shaft 73 is driven through a gear connection with the shaft 74 and a chain and sprocket drive between the shaft 74 and the driven shaft 62. A suitable drive ratio between the driven shaft 62 and the threading ring 55 is about 1:2.

The side wall of the threading ring is provided with a longitudinal passage 75 into which the binding line 76 is passed. During the operation of the stringing mechanism the binding line is fed from a suitable reservoir such as 77, shown in Figure 3, through tensioning devices which may include conventional rollers 78, a line weight such as 79, and through the passage of 75 of the threading ring to the needle hook. The rotation of the threading ring is timed with respect to the entry of the needle hook into the ring so that the line extending from the end of the passage 75 which is facing the needle is carried over the hook while it is within the ring to insure an engagement of a bight of the line by the hook. After the bight of line has been cast on the hook by the threading ring and a retraction of the needle is initiated, the bolt actuating mechanism acts to move the bolt prong 59 forwardly over the opening of the hook and retains the bight within the hook.

A loop shedder generally indicated by the numeral 80 is fixed to the outer side of the wall 53 and is provided with a needle passing aperture which registers with that formed in the wall 53. The shedder includes a pivoted finger 81, one end of which is caused to bear firmly on the surface of the needle body by a light spring 82 abutting the other end of the finger and the body of the shedder.

The operation of a machine constructed and arranged according to the foregoing description and illustrations is diagrammed in more detail in Figures 12-17, inclusive.

Referring to Figure 12, it may be assumed that the binding line 76 has been passed from the supply source through the tensioning devices and through the aperture 75 in the threading ring to the hook of the needle which is shown in position to begin its advance across the crop receiving space 36. It will be assumed that the crops have been deposited on the conveyors so that the butt ends of the stems are toward the side of the conveyors on which the stringing mechanism is mounted. In this instance the crops will be fed downwardly through the crop receiving space by the action of the return reaches of the conveyors and will depress the portion of the binding line extending across the space in the manner illustrated in the figure. The needle element is thereafter advanced to the position shown in Figure 13 in which the hook of the needle extends well within the central aperture of the threading ring 55. In the course of the needle movement through the shedder 54, the loop of line shown in the needle hook in Figure 12 will be held back by the outer face of the shedder 54 as the needle advances into the shedder. For convenience of illustrating the stringing action effected, the loop has been shown further to the rear of the needle shank in Figures 13, 14 and 15 than it would ordinarily be positioned during the operation of the device. It will be observed that the line emerging from the aperture 75 in Figure 13 is to the rear of the needle as viewed therein. The direction of rotation of the threading ring is such that the top portion thereof shown in the drawings moves towards the observer. It will be seen, therefore, that the rotation of the threading ring will cast the line 76 over the top of the needle shank into the position illustrated in Figure 14. As the needle is retracted across the crop receiving space the bight of line cast over the needle by the threading ring will be engaged by the hook portion of the needle. Shortly after the retractive movement of the needle has been initiated and the bight engaged by the hook, the bolt 57 is advanced by the action of the cam 68 on the cam roller 67 and the prong 59 of the bolt closes the hook opening to provide an eye in which the binding line is securely and slidingly retained. This condition is illustrated in Figure 15. As the needle end is further withdrawn from the crop receiving space and passes beneath the shedding finger 81, the finger acts to push the loop lying over the needle off the end thereof and on to the strand of line passing from the threading ring to the needle. Figure 16 illustrates the condition existing after the loop has been shed by the finger 81 and the needle has been moved to its fully retracted position. In this position succeeding portions of the harvested crop being delivered downwardly through the crop receiving space will engage the strand extending across the space and tend to depress it slightly so that the needle will pass above this portion of the crop in its succeeding movement across the crop receiving space. Additionally, the movement of the needle toward the threading ring will increase the depth of the bight of the strand on which the successive portions of the crop are being received so that it is insured that each loop will encompass a substantial number of the butt ends of the leaves being delivered. Figure 17 illustrates the initiation of a succeeding movement of the needle element across the crop receiving space. In the manner previously described, the loop lying in the hook of the needle, and held thereon by the downward pull of the crops previously strung to the line, will be pressed rearwardly along the shank of the needle as the hook enters the annular loop shedder 54. Subsequently, the bight of binding line picked up by the hook within the threading ring and retained thereon by the bolt prong will be drawn through this loop to similarly effect the binding of a successive portion of the harvested crops delivered to the machine.

It will be observed that the arrangement described does not require any type of a forced feeder to compress the crops delivered to the stringing mechanism since by utilizing the return reaches of the two conveyors the combined bulk of the crops carried by each conveyor is delivered into the crop receiving space. Further, slippage under the stringing mechanism is eliminated by the same arrangement in that the weight of the downwardly delivered crops provides the force necessary to depress the strand of line extending across the crop receiving space to the extent necessary to permit the needle on its succeeding movement across the space to pass above a substantial number of stems of the crop being delivered.

It will also be appreciated that by varying the resistance effected by the line tensioning devices, the mass of crops encompassed by each loop of line formed by the stringing mechanism may be controlled.

Having thus described the invention, what is claimed as new and desired to be secured by Letters Patent is:

1. A crop binding machine comprising two endless belt conveyors, the upper runs of said conveyors positioned end to end in substantially the same horizontal plane, the vertical runs of said conveyors positioned to provide a crop receiving space between the mutually facing faces of said vertical runs, a stringing mechanism having a reciprocating needle element, means for supporting said mechanism relative to said conveyors to position said needle element for movement transversely of said space, actuating means for said element, said element acting to string together harvested crops forced downwardly through said space.

2. A crop binding machine as claimed in claim 1 in which said stringing mechanism includes a source of binding line supported to one side of said space, said needle element and said needle element actuating means being supported to the other side thereof, said needle element being actuated to periodically traverse said space and engage said binding line on the said one side of the space, and thereafter draw said line across said space, said line being yieldingly held to slacken as successive portions of the harvested crop being moved downwardly through said space engage said line and depress it, thereby permitting said needle on its succeeding space traversing movement to pass above the successive line depressing portions of the crop and string the same together on said line.

3. A crop binding machine as claimed in claim 2 in which the distal end of said needle element is provided with a hook adapted to engage a bight of the binding line to the said one side of the space, said stringing mechanism including the annular threading ring mounted to said one side of the space and arranged to receive in its central opening the distal end of said needle element, said threading ring being provided with a longitudinal passage for said line opening at a point thereon beyond which the said needle hook is advanced, and means for rotating said ring, whereby a bight of the binding line will be cast onto the said hook of the needle as it moves within the said rotating threading ring.

4. A crop binding machine as claimed in claim 3 in which said needle element comprises a needle, and a bolt slidable longitudinally in the body of said needle, one end of said bolt in its forward position extending across the opening of said hook, and means for advancing and retracting said bolt periodically, said last named means acting to advance said bolt across the opening of said hook after the binding line has been cast on said hook by the rotation of said threading ring and maintain the bolt in advanced position during the movement of said needle away from said threading ring, and to retract said bolt during the movement of the said needle towards said threading ring.

5. A crop binding machine as claimed in claim 4 in which said stringing mechanism includes loop shedding means mounted on either side of said space intermediate the said threading ring and the said needle and bolt actuating means, said shedding means comprising elements spaced from the circumference of the shank of said needle a distance less than the diameter of the binding line, whereby free loops of line developed around said needle are retained between said shedding means.

6. A crop binding machine as claimed in claim 5 in which said needle element actuating means comprises a driven shaft, an eccentric mounted on said shaft, a rod connected between said eccentric and the shank of said needle, spring means abutting the proximal ends of said needle body and said bolt and yieldingly urging said bolt towards retracted position, said eccentric being provided with a cammed edge, a cam follower fixed to the end of said bolt and positioned to be engaged by said cammed edge, said cammed edge being configured to cause said bolt to advance against said spring as the said needle is caused to move away from said threading ring as aforesaid.

7. A crop binding machine as claimed in claim 6 in which said threading ring rotating means comprises a rotatable power transmission shaft, said shaft being driven by said driven shaft and driving said threading ring.

No references cited.